(12) United States Patent
Shin et al.

(10) Patent No.: US 8,691,927 B2
(45) Date of Patent: Apr. 8, 2014

(54) VINYL CHLORIDE RESIN WITH LOW VISCOSITY FOR FOAMING APPLICATION AND METHOD OF PREPARING THE SAME

(75) Inventors: Hyun Jin Shin, Seoul (KR); Kyung Seog Youk, Yeosu-si (KR); Han Hong Kim, Yeosu-si (KR)

(73) Assignee: LG Chem, Ltd., Seoul (KR)

( * ) Notice: Subject to any disclaimer, the term of this patent is extended or adjusted under 35 U.S.C. 154(b) by 51 days.

(21) Appl. No.: 13/377,466

(22) PCT Filed: Jun. 10, 2010

(86) PCT No.: PCT/KR2010/003720
§ 371 (c)(1),
(2), (4) Date: Jan. 5, 2012

(87) PCT Pub. No.: WO2010/143893
PCT Pub. Date: Dec. 16, 2010

(65) Prior Publication Data
US 2012/0123077 A1    May 17, 2012

(30) Foreign Application Priority Data

Jun. 10, 2009 (KR) .................. 10-2009-0051372

(51) Int. Cl.
*C08F 114/06* (2006.01)
*C08F 2/24* (2006.01)

(52) U.S. Cl.
USPC .................. 526/344.2; 526/344

(58) Field of Classification Search
USPC .............................. 526/344, 344.2
See application file for complete search history.

(56) References Cited

U.S. PATENT DOCUMENTS

| | | | |
|---|---|---|---|
| 6,245,848 B1 * | 6/2001 | Espiard et al. | 524/419 |
| 2012/0123077 A1 | 5/2012 | Shin et al. | |

FOREIGN PATENT DOCUMENTS

| | | |
|---|---|---|
| CN | 1170730 A | 1/1998 |
| KR | 10-0252532 | 4/2000 |
| KR | 10-0252532 B1 | 4/2000 |
| KR | 20100132663 A | 12/2010 |

* cited by examiner

*Primary Examiner* — Robert D. Harlan
(74) *Attorney, Agent, or Firm* — McKenna Long & Aldridge

(57) ABSTRACT

Provided are a vinyl chloride-based resin formed by polymerization of vinyl chloride-based small seed particles having an average particle diameter range of 0.15 µm to 0.5 µm prepared by emulsion polymerization and vinyl chloride-based large seed particles having an average particle diameter range of 0.51 µm to 0.8 µm prepared by micro-suspension polymerization, in which a content ratio (weight ratio) of the large seed particles to the small seed particles is in a range of 1 to 2, and a method of preparing the vinyl chloride-based resin. Excellent low viscosity characteristics of the vinyl chloride resin at high and low shear rates may be obtained by controlling the particle size of the small seed prepared by emulsion polymerization.

6 Claims, No Drawings

VINYL CHLORIDE RESIN WITH LOW VISCOSITY FOR FOAMING APPLICATION AND METHOD OF PREPARING THE SAME

CROSS-REFERENCE TO RELATED APPLICATIONS

This application is a National Phase Entry of PCT International Application No. PCT/KR2010/003720, filed Jun. 10, 2010, which claims the benefit of Patent Application No. 10-2009-0051372 filed in Korea on Jun. 10, 2009. The entire contents of all of the above applications are hereby incorporated by reference into the present application.

BACKGROUND

The present invention disclosed herein relates to a vinyl chloride-based resin having excellent low viscosity characteristics and a method of preparing the same, and more particularly, to a method of preparing a vinyl chloride-based resin, in which two or more seed particles having different average particle diameters are used as a seed for a seeded emulsion polymerization method and low viscosity characteristics at low and high shear rates may be obtained by controlling the particle size of the seed having a smaller particle size.

With respect to a typical paste resin used for flooring material foaming, two or more particles having different sizes (large/small) are generally used to have low viscosities at low and high shear rates, and therefore, ease of processing may be provided.

Micro-suspension polymerization and seeded emulsion polymerization have been used as a method of polymerization of the paste resin used therein. With respect to micro-suspension polymerization, two or more vinyl chloride resin latexes having different sizes are generally used through mixing because the control of a particle size distribution is difficult. Production costs may be high because a reaction time is also longer than that of seeded emulsion polymerization. Different seed particles, generally two types of seeds, are used as a seed for the seeded emulsion polymerization, in which a small seed is prepared by emulsion polymerization and a large seed is prepared by micro-suspension polymerization. Monomer droplets are prepared by using a homogenizer, in which a vinyl chloride-based monomer, an emulsifier, an oil-soluble polymerization initiator are added and pressure is applied, or a rotor-stator type homogenization pump in terms of centrifugal force, and the large seed is then prepared by polymerization thereof.

Since the seeded emulsion polymerization is performed by using different seed particles, particle size control may be facilitated. However, a particle diameter of a final product may greatly depend on particle sizes of the large seed prepared by the micro-suspension polymerization and the small seed prepared by the emulsion polymerization. Typically, a large seed having a size range of 0.5 μm to 0.8 μm and a small seed having a size range of 0.08 μm to 0.13 μm have been used.

In the seeded emulsion polymerization, viscosity and foaming properties are controlled by controlling a ratio between the large seed and the small seed. Herein, the size of the small seed and a content thereof introduced in the seeded emulsion polymerization may significantly influence viscosity and foaming properties, such as foamed cell density, resilience, and whiteness.

Excellent foam properties may typically be obtained when the small seed is introduced in an amount of 2.5 ppm or more. However, since typically used small seed particles having a size range of 0.08 μm to 0.13 μm deteriorate low shear viscosity, the introduction thereof may be limited. The reason for this is that limitations in plastisol mixing and pumping may be generated in a production plant.

SUMMARY

The present invention is for resolving the foregoing typical limitations in preparing a vinyl chloride-based resin by polymerization of two types of seed particles having different particle sizes through seeded emulsion polymerization.

The present invention provides a vinyl chloride-based resin having improved high and low shear viscosity characteristics by controlling a particle size of a small seed used in a seeded emulsion polymerization method.

The present invention also provides a method of preparing a vinyl chloride-based resin having the foregoing characteristics.

The present invention also provides a plastisol including the vinyl chloride-based resin.

In the present invention, a particle size of relatively smaller seed particles is controlled to be different from a typically used size range of 0.08 μm to 0.13 μm during preparation of a vinyl chloride resin by seeded emulsion polymerization of two types of seed particles having different particle sizes. Therefore, limitations in preparing a vinyl chloride resin having low viscosity may be resolved, in which the input thereof is limited because the vinyl chloride resin may deteriorate low shear viscosity.

DETAILED DESCRIPTION OF THE EMBODIMENTS

A vinyl chloride-based resin of the present invention is formed by polymerization of vinyl chloride-based small seed particles having an average particle diameter range of 0.15 μm to 0.5 μm and vinyl chloride-based large seed particles having an average particle diameter range of 0.51 μm to 0.8 μm, and a content ratio (weight ratio) of the large seed particles to the small seed particles is in a range of 1 to 2.

Also, a method of preparing a vinyl chloride-based resin of the present invention includes adding vinyl chloride-based small seed particles having an average particle diameter range of 0.15 μm to 0.5 μm, vinyl chloride-based large seed particles having an average particle diameter range of 0.51 μm to 0.8 μm, a vinyl chloride-based monomer, an emulsifier, and an initiator to perform seeded emulsion polymerization.

Hereinafter, the present invention will be described in more detail.

The present invention relates to a vinyl chloride-based resin having excellent low viscosity characteristics and a method of preparing a resin having excellent viscosity and foaming properties by using a small seed having a specific range deviating from a typically used size range, with respect to a method of seeded emulsion polymerization by using a vinyl chloride monomer, an emulsifier, and an oil-soluble initiator.

In the present invention, two types of vinyl chloride-based seeds are used by being prepared in advance. First, a vinyl chloride-based seed having a smaller particle size is prepared by emulsion polymerization and the particle size thereof is in a range of 0.15 μm to 0.5 μm. Since a final vinyl chloride-based resin prepared by seeded emulsion polymerization using the seed having the foregoing average particle diameter range has a viscosity reduction effect during preparation of plastisol in comparison to the use of a typically small seed having a particle size range of 0.08 μm to 0.13 μm, reduction of liquid-phase raw materials during processing, production of high-hardness products, and excellent workability may be possible.

A method of preparing the vinyl chloride-based small seed particles follows typical emulsion polymerization and descriptions with respect to a specific synthesis process will not be provided in the present invention. The vinyl chloride-based seed having a larger particle size of the present invention is prepared by micro-suspension polymerization and an average particle diameter thereof is in a range of 0.51 μm to 0.8 μm. A method of preparing the vinyl chloride-based large seed follows typical micro-suspension polymerization and descriptions with respect to a specific synthesis process will not be provided in the present invention.

An average particle diameter of a finally prepared resin may be made larger by using the vinyl chloride-based emulsion polymerization seeds having two different average particle diameter ranges and typically used two different micro-suspension polymerization and emulsion polymerization seeds may be used at a proper ratio.

That is, a final particle size distribution may be controlled by controlling an input ratio of the foregoing seed particles, and input amounts of typically used two seed latexes may be in a range of 1.0 to 10.0 parts by weight with respect to a vinyl chloride monomer (typically referred to as "VCM"), respectively. In the present invention, a content ratio (weight ratio) of the large seed to the small seed may particularly be controlled in a range of 1 to 2. When the content ratio (weight ratio) of the large seed to the small seed is less than 1, it may be undesirable because an increase in viscosity is large in a high shear region, and when the content ratio (weight ratio) of the large seed to the small seed is greater than 2, large dilatancy may occur in a high shear region and foaming properties may be poor.

A vinyl chloride-based resin according to the present invention, which is prepared by adding the foregoing vinyl chloride-based two types of seed particles having different particle sizes at the foregoing mixing ratio, has typically a particle size range of 0.1 μm to 4 μm, and a vinyl chloride-based resin having an average particle diameter range of 0.8 μm to 1.5 μm may be obtained.

Meanwhile, the present invention provides a method of preparing a low viscosity vinyl chloride-based resin through seeded emulsion polymerization by adding vinyl chloride-based small seed particles having an average particle diameter range of 0.15 μm to 0.5 μm, vinyl chloride-based large seed particles having an average particle diameter range of 0.51 μm to 0.8 μm, a vinyl chloride-based monomer, an emulsifier, and an initiator.

In the present invention, two types of vinyl chloride-based seed particles having different particle sizes are first prepared. As described above, the vinyl chloride-based large seed particles are prepared by micro-suspension polymerization and the large seed particles having an average particle diameter range of 0.51 μm to 0.8 μm are prepared.

Also, the vinyl chloride-based small seed particles are prepared by emulsion polymerization and the small seed particles having an average particle diameter range of 0.15 μm to 0.5 μm are prepared. A polymerization initiator used during the preparation of the small seed is a water-soluble polymerization initiator and potassium persurfate is widely used. The two types of the vinyl chloride-based seed particles having different particle sizes are prepared, and a vinyl chloride-based latex is then prepared through seeded emulsion polymerization by adding deionized water, a vinyl chloride monomer, the two types of the vinyl chloride-based seed particles, an emulsifier, and an initiator.

The seeded emulsion polymerization method follows a typical method and a reaction temperature may be in a range of 50° C. to 64° C. A polymerization time may be prolonged when the reaction temperature is less than 50° C. and pressure control is not facilitated when the reaction temperature is greater than 64° C.

1.0 to 10.0 parts by weight of the respective vinyl chloride-based small seed particles and vinyl chloride-based large seed particles, 0.5 to 2 parts by weight of the emulsifier are added based on 100 parts by weight of the vinyl chloride-based monomer during the seeded emulsion polymerization and the initiator is included in the large seed introduced.

The emulsifier of the present invention may be an anionic emulsifier, a non-ionic emulsifier, or a mixture thereof. The anionic emulsifier generally maintains the stability of a latex during polymerization and the non-ionic emulsifier may be used to obtain low viscosity characteristics. The anionic emulsifier may be one selected from the group consisting of a carboxylic acid, an alkyl sulfonate, an alkyl benzene sulfonate, a sulfosuccinate, a α-olefin sulfonate, and an alkyl phosphoric acid.

The anionic emulsifier may be used in an amount range of 0.5 to 1.5 parts by weight based on 100 parts by weight of the vinyl chloride-based monomer. When the anionic emulsifier is used within the foregoing range, polymerization and mechanical stability of the latex may be good.

The non-ionic emulsifier usable to control viscosity may be one selected from the group consisting of a polyoxyethylene ether, a polyoxyethylene alkyl phenyl ether, a polyoxyethylenealkenyl ether, a polyoxyethylene derivative, a glycerin fatty acid ester, a sorbitan fatty acid ester, a polyoxyethylene fatty acid ester, a silicon-based emulsifier, polyethylene glycol and a derivative thereof, and polypropylene glycol and a derivative thereof. The content of the non-ionic emulsifier is not particularly limited and the non-ionic emulsifier may be used in a maximum amount of 0.5 parts by weight based on 100 parts by weight of the vinyl chloride-based monomer.

The initiator according to the present invention is included in the large seed and, in some cases, a sulfate-based water-soluble initiator may also be added in an amount range of 0.001% to 0.01% as an additional initiator during the polymerization.

In addition to the foregoing composition, a surfactant, a filler, and other additives, which may be included in typical seeded emulsion polymerization, may be used within a range that does not deteriorate physical properties of the vinyl chloride-based resin of the present invention.

A particle size distribution of the vinyl chloride particles prepared according to the preparation method of the present invention is a bimodal distribution and therefore, viscosity reduction effects may be obtained at high and low shear rates. The reason for this is that when polymerization is performed by using two or more large and small seed particles, particles generated from the small seed having a size range of about 0.1 μm to 0.3 μm may cause to increase low shear viscosity but may additionally act to decrease high shear viscosity and improve foaming properties.

Therefore, as in the present invention, selection of a particle size of the small seed may be an important factor in decreasing viscosities at high and low shear rates. Accordingly, a vinyl chloride-based resin having low viscosity characteristics at both high and low shear rates may be obtained by appropriately controlling the particle size of the small seed as in the present invention.

In general, since low shear viscosity is important for plastisol mixing and transfer and high shear viscosity is important during coating, easy control of the foregoing two viscosities may be important.

With respect to the vinyl chloride-based resin having low viscosity characteristics as above, since low and high shear viscosities of a plastisol, a semi-processed paste product, may decrease and excellent foaming properties may be obtained, development of a resin suitable to the working conditions of a company may be possible. Also, since the low viscosity paste resin plastisol may be used in a paste resin for flooring material foaming, coating and pumping processes are facilitated, and reduction of volatile liquid-phase subsidiary materials during plastisol mixing, use of a low cost diluent, and an increase in the addition amounts of additives may be possible.

Hereinafter, preferred examples are provided to allow for a clearer understanding of the present invention, but the following examples are merely presented to exemplify the present invention. It will be apparent to those skilled in the art that various modifications and variations can be made in the present invention without departing from the spirit or scope of the invention and it is obvious that such modifications and variations are included in the appended claims.

EXAMPLE 1

Vinyl chloride large seed particles having an average particle diameter of 0.7 μm and a polymerization initiator content in the particle of 1.8% were prepared by using a microsuspension polymerization method. Vinyl chloride small seed particles having an average particle diameter of 0.2 μm were prepared by using emulsion polymerization.

60 kg of deionized water, 80 kg of a vinyl chloride monomer, 0.46 kg of a sodium lauryl sulfate, and vinyl chloride-based large and small seed particles were added into a 200 l high-pressure reactor so as to obtain a content ratio (weight ratio) of the large seed particles to the small seed particles of 1.5, and a vinyl chloride-based latex having a typical particle size range of 0.1 μm to 4 μm and an average particle diameter range of 0.8 μm to 1.5 μm was then prepared by increasing a temperature of the high-pressure reactor at 51° C. and emulsion polymerization for 7 hours.

EXAMPLE 2

A vinyl chloride-based latex having a typical particle size range of 0.1 μm to 4 μm and an average particle diameter range of 0.8 μm to 1.5 μm was prepared by seeded emulsion polymerization in the same manner as Example 1 except that vinyl chloride-based small seed particles having an average particle diameter of 0.3 μm was used.

COMPARATIVE EXAMPLE 1

A vinyl chloride-based latex was prepared by seeded emulsion polymerization in the same manner as Example 1 except that vinyl chloride-based large seed particles having an average particle diameter of 0.5 μm and vinyl chloride-based small seed particles having an average particle diameter of 0.1 μm were used and a content ratio (weight ratio) of the large seed particles to the small seed particles was 1.4.

COMPARATIVE EXAMPLE 2

A vinyl chloride-based latex was prepared by seeded emulsion polymerization in the same manner as Comparative Example 1 except that vinyl chloride-based large seed particles having an average particle diameter of 0.7 μm was used.

COMPARATIVE EXAMPLE 3

A vinyl chloride-based latex was prepared by seeded emulsion polymerization in the same manner as Example 1 except that a content ratio (weight ratio) of vinyl chloride-based large seed particles to vinyl chloride-based small seed particles was 2.3.

TEST EXAMPLE

Average particle diameters and viscosities of vinyl chloride-based polymers prepared in the Examples and Comparative Examples were measured by the following methods, and the results thereof are presented in the following Table 1.

Average particle diameter: Average particle diameters were measured by using a UPA 150 instrument of Microtrac Inc.

Low shear viscosity (Physica Rheometer): 55 parts by weight of dioctyl phthalate as a plasticizer, 80 parts by weight of a filler, 10 parts by weight of a viscosity reducing agent, 2.5 parts by weight of a stabilizer, and 2 parts by weight of a foaming agent were added to 100 parts by weight of vinyl chloride powder-phase paste resin prepared in the Examples and Comparative Examples and a mixture was stirred at 500 rpm for 10 minutes, and a paste sol was then prepared by mixing at 800 rpm for 10 minutes. The paste sol was vacuum deaired and stored at 25° C. for 1 hour, and low shear viscosities were then measured with a cylinder-type spindle at a shear rate of 1/s.

High shear viscosity (Physica Rheometer): High shear viscosities were measured with a cylinder-type spindle at a shear rate of 1000/s.

Foamed cell: Coating paper was coated with a plastisol and then heated at 200° C. for 2 minutes by using a Mathis oven. Thereafter, foamed cells were optically analyzed by using an optical microscope to relatively compare one another.

TABLE 1

| | Example 1 | Example 2 | Comparative Example 1 | Comparative Example 2 | Comparative Example 3 |
|---|---|---|---|---|---|
| Large seed size (μm) | 0.7 | 0.7 | 0.5 | 0.7 | 0.7 |
| Small seed size (μm) | 0.2 | 0.3 | 0.1 | 0.1 | 0.2 |
| Seed content ratio (weight ratio) (Large seed/Small seed) | 1.5 | 1.5 | 1.4 | 2.5 | 2.3 |
| Low shear viscosity (Pa · s) | 7.4 | 8.1 | 19 | 9.3 | 7.6 |
| High shear viscosity (Pa · s) | 7.8 | 5.0 | 4.7 | 7.6 | 6.6 |
| Foamed cell | ◎ | ○ | ◎ | ○ | Δ |

As shown in Table 1, a vinyl chloride resin of Example 1 prepared according to the present invention had characteristics in that tendency of viscosity increase in a high shear region may be effectively prevented and viscosity in a low shear region may be significantly improved.

As shown in the foregoing results, since viscosity and foamed cell characteristics were contradictory to each other, it was very difficult to satisfy both of them. With respect to Comparative Example 1, high shear viscosity was good, but there were limitations in working because low shear viscosity was high, and density of a foamed cell was also poor. With respect to Comparative Example 2, viscosity was good, but there were limitations in that a foamed cell may not be used as a product because of very poor characteristics.

As a result of reducing the use amount of the small seed in Comparative Example 3, fluidity was maintained similar to Example 1, but foaming properties were adversely affected. Therefore, foaming properties may also be improved when an appropriate amount or more of the small seed was included.

According to the present invention, a particle size distribution of a vinyl chloride-based paste resin may be controlled through controlling a particle size of a small seed used in seeded emulsion polymerization. Since particles having the controlled particle size distribution may reduce low and high shear viscosities of a plastisol, a semi-processed paste product, and excellent foaming properties may be obtained, development of a resin suitable to the working conditions of a company may be possible. Also, since the low viscosity paste resin plastisol may be used in a paste resin for flooring material foaming, coating and pumping processes are facilitated, and reduction of volatile liquid-phase subsidiary materials during plastisol mixing, use of a low cost diluent, and an increase in the addition amount of a filler may be possible.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A vinyl chloride-based resin characterized in that the vinyl chloride-based resin is formed by seeded emulsion polymerization of vinyl chloride-based small seed particles having an average particle diameter range of 0.15 μm to 0.5 μm and vinyl chloride-based large seed particles having an average particle diameter range of 0.51 μm to 0.8 μm,
a content ratio of the vinyl chloride-based large seed particles to the vinyl chloride-based small seed particles is 1-2 by weight ratio, and
the vinyl chloride-based resin has a particle size range of 0.1 μm to 4 μm and an average particle diameter range of 0.8 μm to 1.5 μm.

2. The vinyl chloride-based resin of claim 1, wherein the vinyl chloride-based small seed particles are prepared by emulsion polymerization and the vinyl chloride-based large seed particles are prepared by micro-suspension polymerization.

3. The vinyl chloride-based resin of claim 1, wherein the vinyl chloride-based resin has a bimodal particle size distribution.

4. A method of preparing a vinyl chloride-based resin, the method comprising adding vinyl chloride-based small seed particles having an average particle diameter range of 0.15 μm to 0.5 μm, vinyl chloride-based large seed particles having an average particle diameter range of 0.51 μm to 0.8 μm, a vinyl chloride-based monomer, an emulsifier, and an initiator to perform seeded emulsion polymerization.

5. The method of preparing a vinyl chloride-based resin of claim 4, wherein the vinyl chloride-based small seed particles and the vinyl chloride-based large seed particles are respectively included in an amount of 1.0 to 10.0 parts by weight, and the emulsifier is included in an amount of 0.5 to 2 parts by weight, based on 100 parts by weight of the vinyl chloride-based monomer.

6. A flooring material formed of a plastisol comprising the vinyl chloride-based resin of claim 1.

* * * * *